US012010130B2

(12) United States Patent
Hingos et al.

(10) Patent No.: US 12,010,130 B2
(45) Date of Patent: Jun. 11, 2024

(54) DATA CAPTURE APPARATUS WITH EMBEDDED SECURITY APPLICATIONS AND UNIDIRECTIONAL COMMUNICATION

(71) Applicant: Siemens Mobility GmbH, Munich (DE)

(72) Inventors: David Hingos, East Brunswick, NJ (US); Leandro Pfleger de Aguiar, Robbinsville, NJ (US); Omer Metel, Anchorage, KY (US); Martin Wimmer, Neubiberg (DE); Heiko Patzlaff, Munich (DE)

(73) Assignee: Siemens Mobility GmbH, Munich (DE)

( * ) Notice: Subject to any disclaimer, the term of this patent is extended or adjusted under 35 U.S.C. 154(b) by 328 days.

(21) Appl. No.: 17/276,992

(22) PCT Filed: Sep. 20, 2019

(86) PCT No.: PCT/US2019/052037
§ 371 (c)(1),
(2) Date: Mar. 17, 2021

(87) PCT Pub. No.: WO2020/061388
PCT Pub. Date: Mar. 26, 2020

(65) Prior Publication Data
US 2022/0038479 A1 Feb. 3, 2022

Related U.S. Application Data

(60) Provisional application No. 62/733,861, filed on Sep. 20, 2018.

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC . H04L 63/1425; H04L 63/1416; H04L 63/20; H04L 63/02; H04L 63/0209;
(Continued)

(56) References Cited

U.S. PATENT DOCUMENTS 8,626,078 B2 1/2014 Bennett
10,613,521 B2 * 4/2020 Sandler ............ G05B 19/41835
(Continued)

FOREIGN PATENT DOCUMENTS

CN 103703693 A 4/2014
CN 108076053 A 5/2018
(Continued)

OTHER PUBLICATIONS

International Search Report dated Dec. 4, 2019; Application No. PCT/US2019/052037; 4 pages.

*Primary Examiner* — Tae K Kim

(57) ABSTRACT

An apparatus for monitoring a protected network using unidirectional communication includes a sending unit coupled to one or more devices of the protected network for obtaining network data related to protected network status. The apparatus further includes an eavesdropping unit with an interceptor configured to intercept the requested data within the sending unit via a loop connection between input and output interfaces of the sending unit. The interceptor and the loop connection are inductively coupled and configured for unidirectional communication from the sending unit to the receiving unit. A receiving unit is coupled to the eavesdropping unit for receiving the duplicated data and forwarding the duplicated data to an evaluation system located in a low security external network. A reconfigurable application layer includes at least one modular application configured to
(Continued)

operate security related functions that support intrusion detection.

14 Claims, 4 Drawing Sheets

(58) Field of Classification Search
CPC . H04L 63/0227; H04L 63/10; H04L 63/1408; H04L 63/14
USPC .......................................................... 726/23
See application file for complete search history.

(56) References Cited

U.S. PATENT DOCUMENTS

| | | | | |
|---|---|---|---|---|
| 2004/0167960 A1* | 8/2004 | Kinner | ...................... | H04L 9/40 709/203 |
| 2011/0231510 A1* | 9/2011 | Korsunsky | .............. | G06F 21/55 709/213 |
| 2013/0117849 A1* | 5/2013 | Golshan | ................. | G06F 21/53 726/23 |
| 2016/0381006 A1* | 12/2016 | Rykowski | ........... | H04L 63/0823 713/156 |
| 2017/0034205 A1* | 2/2017 | Canedo | ................. | H04L 63/145 |
| 2017/0061283 A1 | 3/2017 | Rasmussen et al. | | |
| 2018/0083982 A1* | 3/2018 | Asenjo | ................ | H04L 63/0428 |
| 2018/0116022 A1* | 4/2018 | Lörincz | ................... | H04L 67/10 |
| 2018/0124121 A1* | 5/2018 | Blöcher | ................ | H04W 12/02 |
| 2018/0212982 A1* | 7/2018 | Yoshino | .............. | H04L 41/0803 |
| 2018/0213460 A1 | 7/2018 | Adella et al. | | |
| 2018/0364673 A1* | 12/2018 | Van Wensen | ....... | G06F 11/1658 |
| 2020/0202008 A1* | 6/2020 | Pfleger de Aguiar | ....................... | G06F 11/3485 |
| 2020/0404014 A1* | 12/2020 | Pfleger de Aguiar | ....................... | H04L 63/1408 |

FOREIGN PATENT DOCUMENTS

| | | | |
|---|---|---|---|
| DE | 102015200279 A1 | 7/2016 | |
| EP | 2173062 A1 * | 4/2010 | ........... H04L 12/403 |
| EP | 2173062 A1 | 4/2010 | |
| WO | 2018044410 A1 | 3/2018 | |
| WO | WO-2018044410 A1 * | 3/2018 | |

* cited by examiner

DATA CAPTURE APPARATUS WITH EMBEDDED SECURITY APPLICATIONS AND UNIDIRECTIONAL COMMUNICATION

TECHNICAL FIELD

This application relates to cyber security. More particularly, this application relates to an apparatus with embedded software applications to support intrusion detection of a protected network and hardware to ensure unidirectional communication to an external intrusion detection system.

BACKGROUND

Cyber-attacks on private computer networks have long been at the forefront of detection and protection efforts using information technology. Now the threat of cyber attacker intrusion to industrial systems, such as automation and control systems that support critical infrastructure, is gaining attention. Due to aspects like vertical integration of the production systems and horizontal integration of the value chain, industrial control system (ICS) networks are often directly or indirectly connected to IT networks (office network) and the Internet, hence offering an opportunity for cyber attackers to penetrate such environments and exploit any existing vulnerabilities. OT (Operations Technology) systems such as programmable logic controllers (PLCs), Distributed Control Systems (DCS), motion controllers, Supervisory Control and Data Acquisition (SCADA) servers, and Human Machine Interfaces (HMIs) offer many additional challenges when it comes to deploying security measures.

Attack methods have evolved over recent years, from simple methods performed by curious hackers, to advanced persistent threats (APTs) carefully designed by highly motivated top experts, sometimes with extended resources sponsored by nation states. Detecting such targeted attacks and other general attack campaigns require the adoption of security monitoring techniques, including signature-based intrusion detection, behavioral based anomaly detection, endpoint detection and response (EDR), among others.

In contrast to solutions adopted within enterprise information technology (IT) systems to deploy network or host-based security detection mechanisms, industrial systems require non-intrusive methods that minimize the risk of system interruptions. In addition to the existence of significant amount of legacy equipment, Operational Technology (OT) networks operate with embedded systems (e.g., Industrial Internet of Things (IIoT)) that are not supported by original design aspects of the OT network, such as intrusive network and system profiling adopted by port scans and vulnerability enumeration tools.

Current solutions offer anomaly detection for industrial control systems by forwarding network traffic of industrial control systems to central monitoring and intrusion detection systems. However, these solutions are entirely software based, with no hardware-based isolation to avoid direct communication between the monitoring network and the monitored network. Another concern for such software based solutions is the potential for failure to resist sophisticated threats capable of manipulating intrusion detection systems to evade detection. Moreover, any modification to security software likely requires a complete hardware set removal and replacement. While this approach has been well tolerated in the enterprise IT domain, administrators of OT systems deployed in production systems are reluctant to face such overhauls due to high cost and risk involved for any modification to the production system.

SUMMARY

To address the above-mentioned issues, an apparatus is disclosed which adopts fully passive security detection that combines a hardware barrier for unidirectional communication with a remote intrusion detection system and one or more modular applications able to locally host security applications such as intrusion detection, anomaly detection, cryptographic and integrity feature sets, data analytics, and interoperability with remote data analytic platforms for more intensive evaluative operations. The modular applications (e.g., each deployed as application container or virtual machine (VM)) enable flexibility by allowing deployment of applications from different vendors, and by allowing any individual application to be replaced quickly and easily as the need arises for updates or upon discovery of vulnerability. Such a solution addresses the problem of monitoring, capturing and analyzing network data from critical and sensitive systems in a unidirectional way so that a receiving network (e.g., cloud-based Intrusion Detection System (IDS) server) cannot interact with the network being monitored. One or more of the host security applications may be useful for filtering the unidirectional traffic transmitted to one or more out-of-network high capacity servers for efficient use of bandwidth and reduced IDS service costs.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Methods and apparatuses are disclosed for efficient monitoring of a secure network using unidirectional communications to avoid any transmissions to the secure network from a public network used for receiving the monitored data for intrusion detection. Enhanced intrusion detection can identify attempts to exploit vulnerability of the secure network. A trustworthy passive network connection is enabled using the disclosed methods and apparatuses to allow external intrusion detection systems to monitor the critical network for abnormal or malicious activities. The unidirectional connection permits remote condition monitoring, management services, and improved efficiency through data analytics without introducing accessible and exploitable vulnerabilities. Data transmission is carried out by induction, with the additional advantage of only a minimal impact on the properties of the tapped signal. A passive connection with galvanic isolation is achieved with no direct hardwire connection between the two networks to effectively block any attempt to send data via the data capture apparatus into the critical network. Data communication and functionality of the critical network are not impacted or influenced by the data capture apparatus in any way, even in the event of power loss. Errant or unwanted electrical currents that could potentially interfere with the critical network are isolated. The transmissions are unaddressed, providing further protections of the critical network. The data capture apparatus may benefit protected private networks implemented in systems such as industrial automation, railway automation, energy automation, and production automation.

Figure 1:
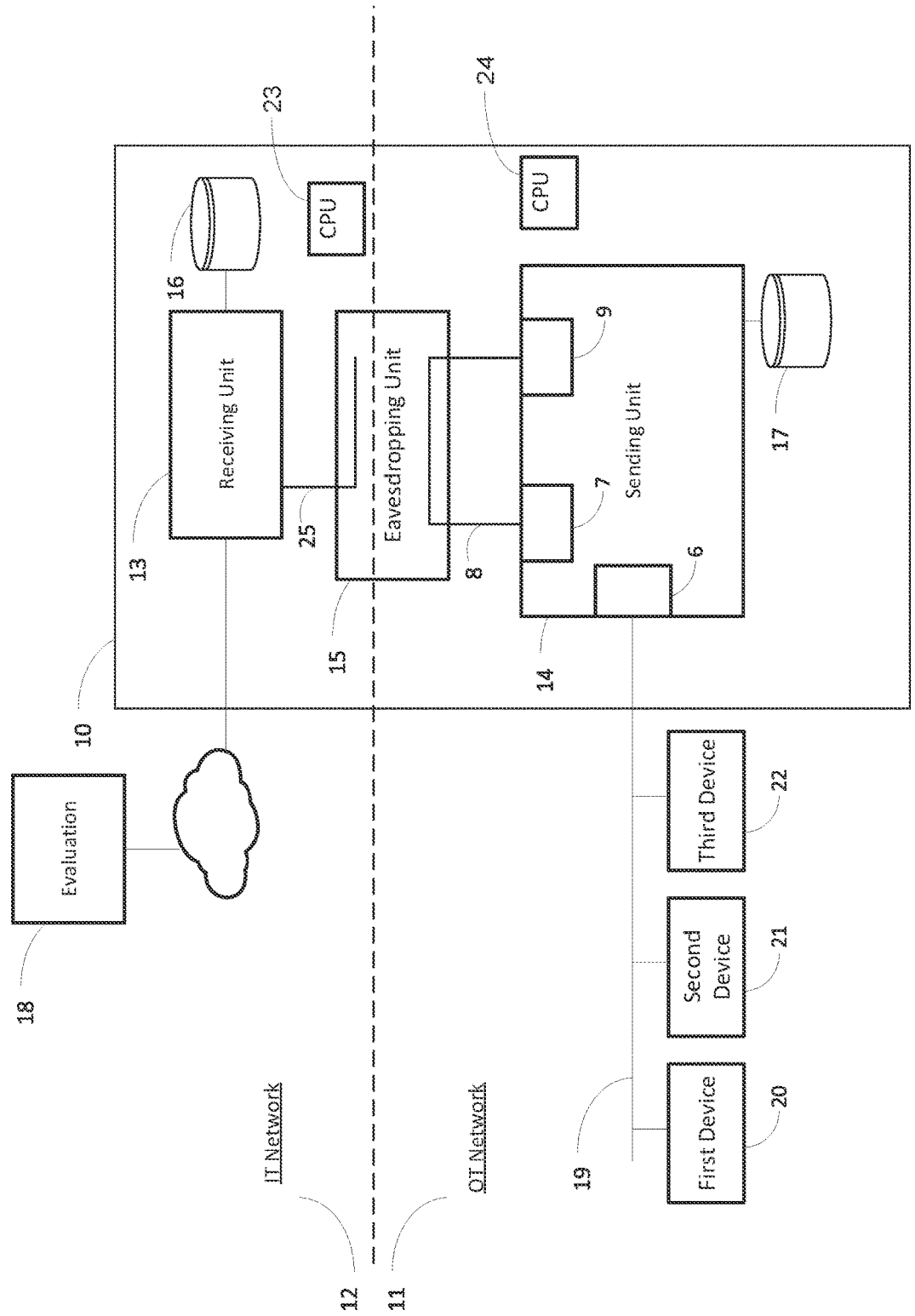
FIG. 1 shows a block diagram for an example of a unidirectional data capture apparatus in accordance with embodiments of the disclosure.

FIG. 1 shows a block diagram for an example of a unidirectional data capture apparatus in accordance with embodiments of the disclosure. A data capture apparatus 10 includes processors 23, 24, a receiving unit 13, a sending unit 14, and an eavesdropping unit 15 for isolating transmissions from an IT network 12 (e.g., a public network) to an OT security network 11 (e.g., a protected and/or private network), and allowing only unidirectional communications from network 11 to network 12. In an embodiment, network 11 may be a private network (e.g., industrial control system, financial network, railway automation and control, or life-critical system) seeking monitoring and evaluation services from a service provider located in an insecure public network 12, such as an internet-based or cloud-based service capable of providing intensive data analysis related to security or diagnostics. Devices 20, 21, 22 of network 11 may include control computers and field devices with sensors and actuators associated with control and operation of a private or critical infrastructure, such as an industrial production facility or a railway automation system. Devices 20, 21, 22 are connected to sending unit 14 via a bidirectional communication connection 19 (e.g., a local area network (LAN) or wireless LAN (WLAN)). In an embodiment, during monitoring and diagnostic activity, sending unit 14 may request network 11 status information collected by devices 20, 21, 22, which may transmit requested information back to the sending unit 14. The bidirectional communication within the network 11 can occur, for example, via an OPC UA protocol. The bidirectional communication connection 19 may include connection setup over all the protocol layers corresponding to an OSI protocol stack of the communication protocol used in network 11. This includes, for example, mutual authentication of the devices 20, 21, 22 and of the request apparatus 14 and a cryptographically protected transmission of the transmitted first data. In this context, the data can be transmitted in encrypted form via the communication connection 19 to carry out secure transmission. The sending unit 14 includes a network interface 6 at which the communication connection 19 is terminated and may include a decryption module to allow data processing of requested data within sending unit 14.

In an embodiment, sending unit 14 may operate in a passive manner (e.g., "sniffing" operation) for passive intrusion detection, in which active requests are not sent to devices 20, 21, 22.

A loop connection 8 is formed between an output interface 7 and an input interface 9 of the sending unit 14. The loop connection 8 is also integrated within eavesdropping unit 15 to form an inductive connection with interceptor 25. The output interface 7 and input interface 9 are isolated from the network interface 6. The requested data can optionally be stored in a request database 17, which can be embodied as an integral component or as a connected external database.

The eavesdropping unit 15 includes interceptor 25. In an aspect, the data stream passing through loop connection 8 is duplicated inductively by interceptor 25 and passed on to receiving unit 13 via a separate connection, while the original data stream flows unchanged in the loop 8 back to input interface 9 of the sending unit 14. The eavesdropping unit 15 represents the connecting point between the network 11 and the network 12. Only duplicated data from the communication connection 8 unidirectionally to receive unit 13 is possible by the inductive configuration of the connection. Data cannot flow from interceptor 25 to connection loop 8, which means secure network 11 has freedom from interference with respect to low security network 12. In an aspect, the interceptor 25 functionality works as a network test access point (TAP) that intercepts the transmission between input interface 7 and output interface 9, via loop connection 8 and copies that data to a monitor port in receiving unit 13. In an embodiment, interceptor 25 is implemented as a switched port analyzer (SPAN) that performs port mirroring of the intercepted transmissions on loop connection 8.

An evaluation database 16 in which the duplicated data is stored can optionally be connected to the receiving unit 13. The evaluation database 16 can also be embodied as an integral component of the receiving unit 13.

Receiving unit 13 may include embedded cyber security applications ("apps") useful for supporting continuous security monitoring and diagnosis (e.g., such as local intrusion detection or anomaly detection) of the network 11, which will later be described in detail. For intensive evaluation, such as intrusion detection, data analytics, etc., requested status information of the devices 20, 21, 22 may be transferred to an out-of-network evaluation system 18 in network 12 (e.g., cloud-based network, office network, or public network). A technical solution to ensure unidirectional communication by feedback-free transmission of data (i.e., freedom from interference) is achieved by a physically isolated connection (i.e., the inductive coupling) between network 11 and network 12 in eavesdropping unit 15.

The duplicated data which is received in the receiving unit 13 can either be transmitted to the evaluation system 18 by way of a push mechanism (i.e., by active passing on such as in a publish-and-subscribe approach), or in the case of buffering in the evaluation database 16, can be by way of a pull mechanism by the evaluation system 18 (i.e., actively requesting the receiver apparatus 13 or the evaluation database 16).

In a similar way, the requested data which is requested by the sending unit 14 in the secure network 11 can be buffered in request database 17 and transmitted, for example at regular intervals or at predefined time intervals, via the loop connection 8.

Figure 2:
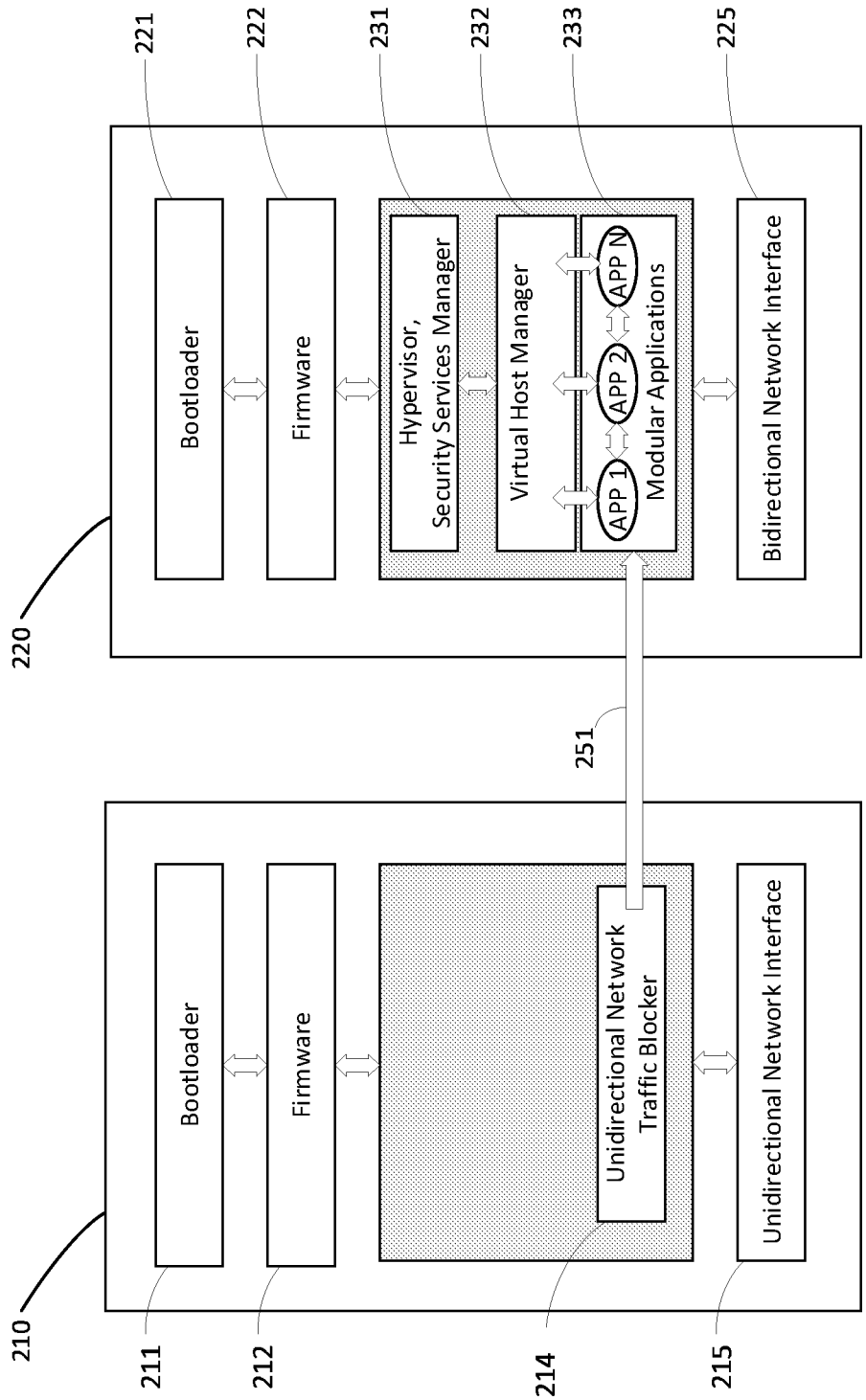
FIG. 2 shows an example of a software stack of the data capture apparatus in accordance with embodiments of this disclosure.

The data capture apparatus 10 includes processors 23, 24 that may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. In an aspect, any software and firmware deployed in receiving unit 13 are executed by processor 21. In an aspect, any software and firmware deployed in sending unit 14 are executed by processor 22 to maintain physical isolation between network 11 and network 12 to ensure unidirectional communication. Processors 23, 24 may also comprise memory storing machine-readable instructions executable for performing tasks. Processor 21 acts upon information by manipulating, analyzing, modifying, converting or transmitting information for use by an executable procedure or an information device, and/or by routing the information to an output device. Processors 23, 24 may use or comprise the capabilities of a computer, controller or microprocessor, for example, and be conditioned using executable instructions to perform special purpose functions not performed by a general purpose computer. Processor 21 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, processors 23, 24 may have any suitable microarchitecture design that includes any number of constituent components such as, for example, registers, multiplexers, arithmetic logic units, cache controllers for controlling read/write operations to cache memory, branch predictors, or the like. The microarchitecture design of the processors 23, 24 may be capable of supporting any of a variety of instruction sets FIG. 2 shows an example of a software stack of the data capture apparatus in accordance with embodiments of this disclosure. In an aspect, sender stack 210 and receiver stack 220 handle operations of the trusted side and untrusted side of data capture apparatus 10, respectively. In an embodiment, software/firmware architecture of sending stack 210 operates within the sending unit 14 while software architecture of receiving stack 220 operates within the receiving unit 13.

Sender stack 210 includes a bootloader 211 and firmware 212 that includes operational instructions for the data capture apparatus 10. A unidirectional network traffic blocker application 214 controls unidirectional data flow for the data capture apparatus 10. For example, operation of the hardware duplicator of loop connection 8 and interceptor 25 may be controlled by a field programmable gate array (FPGA), which may operate according to the instructions of unidirectional network traffic blocker application 214. Unidirectional network interface 215 controls unidirectional data flow 251 of the data capture apparatus 10.

Receiver stack 220 includes a bootloader 221 and firmware 222 that runs the receiving unit 14 with operational instructions. The bootloader 221 may load a bridge system for loading one or more applications. Each application may work with a hypervisor 231 that provides isolation between each modular application APP1, APP2, . . . , APPN of application layer 233. Virtual host manager 232 may include library, runtime and kernel required for the modular applications to function. One or more modular applications of application layer 233 may implement functionalities and capabilities that can include, but are not limited to, security anomaly detection, intrusion detection, cryptographic and integrity feature sets, data analytics, connectivity and interoperability with one or more external data platforms (e.g., evaluation system 18). In an aspect, one or more applications of application layer 233 may be operational in combination. For example, the modular applications may include a first application with signature-based intrusion detection functionality and a second application with behavioral based anomaly detection functionality. Network 11 traffic is exposed to applications of application layer 233 via duplicated data at sending unit 14. Bidirectional network interface 225 controls bidirectional data flow of the data capture apparatus 10.

An advantage of deployment of modular applications of application layer 233 in the receiving unit 13 (i.e., on the receiver side of eavesdropping unit 15) is to deliver security functionality of each application with the ability for impromptu addition and removal of applications of application layer 233. The modular applications of application layer 233 can be distributed and deployed from an application marketplace where device operators can select applications as appropriate and automatically install or remove them via a management tool provided as part of the data capture apparatus 10. For example, in support of evaluation system 18, APP1 may be deployed to implement a packet filtering function, to reduce the transmitted data in unidirectional communications. Modular applications of application layer 233 allow control of performance overhead for a running application by dividing functionalities among applications APP1, APP2, . . . , APPN. Another advantage of modular applications of application layer 233 is that the data capture apparatus 10 is easily reconfigurable, without having to restructure or modify the architecture of the secure network 11. Additionally, deployment of modular applications is flexible by allowing deployment of applications or libraries that are not specific to any one vendor or manufacturer, including the original equipment manufacturer (OEM). This flexibility allows maintaining protection of network 11 with up-to-date deployment of new software-based technologies including analytics capabilities, as they become available, or in the event that one particular application is revealed to possess a newly discovered vulnerability requiring a patch or replacement with an application from a different vendor. One or more of the security applications of application layer 233 can provide cost effective, decentralized analysis of captured date and early warning capability by alerting a network 11 operator upon discovery of anomalous data packets.

In an aspect, analytics and evaluation of network traffic 11 may be divided between security applications of application layer 233 and evaluation system 18 for a balance of centralized and decentralized intrusion detection.

Figure 3:
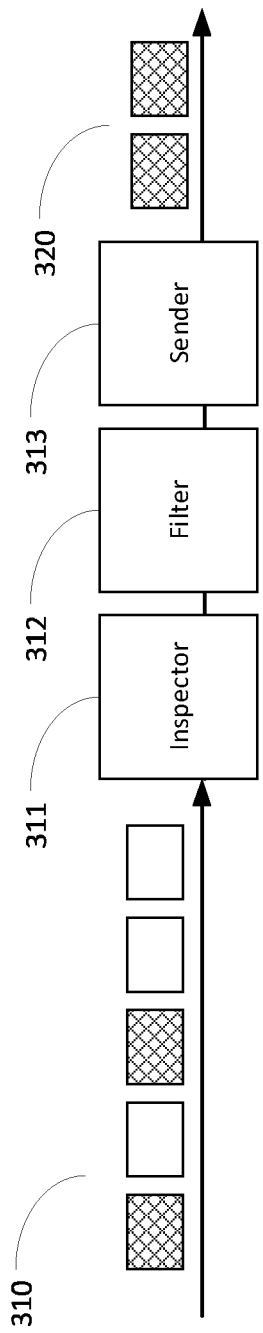
FIG. 3 shows an example of a packet filtering function in accordance with embodiments of this disclosure.

FIG. 3 shows an example of a packet filtering function in accordance with embodiments of this disclosure. Requested data packets 310 represent duplicated data received by the receiving unit 13. An inspector 311 parses the network packets 310. A filter 312 applies a packet filtering function to reduce the number of packets 320 to be forwarded by sender unit 313 to evaluation system 18 across network 12. This reduction of unidirectional traffic on network 12 reduces costs of cloud-based deployment of evaluation system 18, which costs can accrue on a pay per data packet fee structure. The packet filtering function of filter 312 may be programmed to transmit only potentially malicious data packets, such as data packets that indicate an anomaly based on a filter rule. For example, a comparative analysis may use baseline data established by historical data monitoring by a local industrial control system of the network 11. Such a packet filtering function can eliminate any need for a separate firewall computer.

In an aspect, the captured data at receiving unit 13 is forensically sound, being digitally signed with a verifiable certificate so that if the captured data is tampered or corrupted, the signature will not be valid. For example, applications of application layer 233 may include a digital integrity functionality that encodes a PKI/digital certificate that can provide tamper proofing of collected data at rest and in transit. Stored traffic data can be verified for digital certificates and/or signatures. When monitoring the captured data, one or more security applications of application layer 233 are run to analyze the data for security anomalies or other behavior that is dependent on an application or other embedded software library. An anomaly is defined as a change or fluctuation in network or process data which suggests a malfunction for cybersecurity.

In an aspect, the data capture apparatus 10 is configured with a protective features such that the receiving unit 13, sending unit 14, and eavesdropping unit 15 are capable of operating in a physically harsh environment, such as a manufacturing, power generation, mobility, or other industrial environment. For example, a protective housing can prevent electromagnetic interference from industrial processes, resilient mounts can prevent abnormal operation due to vibration, and thermal management features (e.g., heat sink, fan, mastic, or the like) can protect against overheating in a thermally harsh environment.

In an aspect, the data capturing apparatus 10 provides a self-contained, industrial grade, single device solution for intrusion detection in a protected network free from interference, and avoids directly connected data collection by a non-secure intrusion detection system. Unlike solutions that involve installation of an app suite onto a monitoring device, the data capturing apparatus 10 is capable of reconfigurable modular application functionality.

Figure 4:
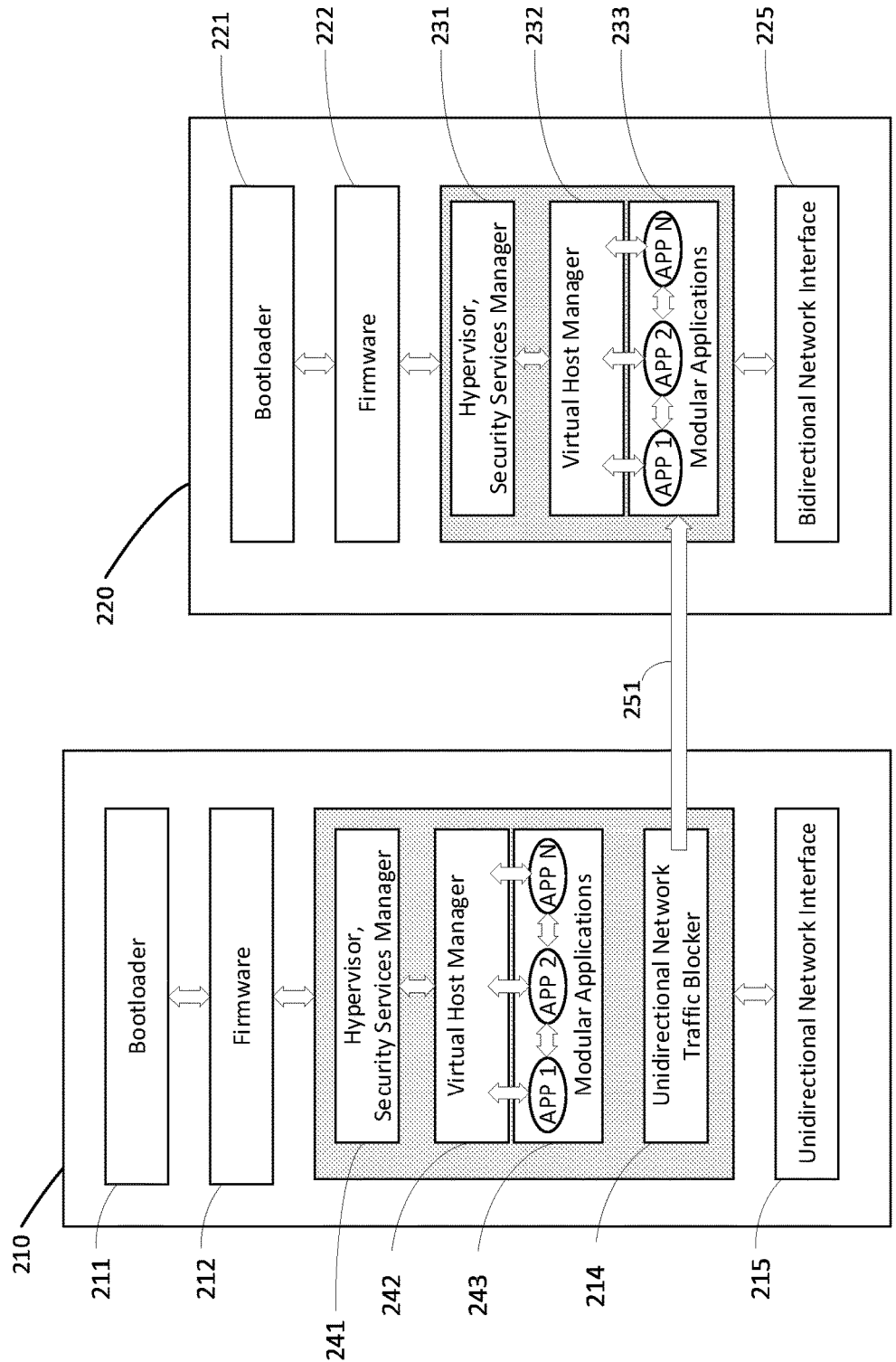
FIG. 4 shows another example of a software stack of the data capture apparatus in accordance with embodiments of this disclosure.

FIG. 4 shows another example of a software stack of the data capture apparatus in accordance with embodiments of this disclosure. As a variation of the embodiment shown in FIG. 2, sender stack 210 may deploy redundant applications of application layer 243 that match applications of application layer 233 of receiver stack 220. In an aspect, test results of the redundant applications are compared to check for anomalies. Each of applications of application layer 243 may work with a hypervisor 241 that provides isolation between each application APP1, APP2, . . . , APPN of application layer 243. Virtual host manager 242 may include library, runtime and kernel required for modular applications 243 to function.

In an aspect, application layers 233, 243 may be reconfigured by deploying, removing, or replacing applications individually according to security needs of network 11. Configuration of application layers 233, 243 may by shared over the network 11.

In an aspect, one or more applications of application layers 233, 243 may provide the ability to capture and analyze process data separate from general network data of network 11.

In an aspect, one or more applications of application layers 233, 243 may be deployed as an application container (e.g., Docker). Alternatively, one or more applications of application layers 233, 243 may be deployed as a guest virtual machine (VM) or as a virtualized application.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof.

What is claimed is:

1. An apparatus for monitoring a protected network using unidirectional communication, the apparatus comprising:
a sending unit coupled to one or more devices of the protected network, wherein the sending unit obtains network data related to protected network status;
an eavesdropping unit comprising an interceptor configured to intercept the network data within the sending unit via a loop connection between input and output interfaces of the sending unit, wherein the interceptor and the loop connection are inductively coupled, and the network data is duplicated without interfering with transmissions of the network data within the protected network; and
a receiving unit coupled to the eavesdropping unit for receiving the duplicated data and forwarding the duplicated data as forwarded traffic to an evaluation system located in a public network, the receiving unit comprising:
a reconfigurable application layer including at least one modular application configured to operate security related functions that support intrusion detection, wherein the at least one modular application includes functions for connectivity and interoperability with the evaluation system, wherein analytics and evaluation of the network data is divided between the reconfiguration application layer that is defined by the receiving unit of the apparatus, and the evaluation system that is defined by the public network in communication with the at least one modular application of the reconfigurable application layer;
wherein the inductive coupling of the interceptor and the loop connection is configured for unidirectional communication from the sending unit to the receiving unit.

2. The apparatus of claim 1, wherein the at least one modular application includes a packet filtering function that reduces the forwarded traffic to the evaluation system.

3. The apparatus of claim 1, wherein the at least one modular application includes behavioral based anomaly detection functionality.

4. The apparatus of claim 1, wherein the at least one modular application includes signature-based intrusion detection functionality.

5. The apparatus of claim 1, wherein the at least one modular application includes cryptographic and integrity feature sets functionality.

6. The apparatus of claim 1, wherein the at least one modular application includes data analytics functionality.

7. The apparatus of claim 1, wherein the at least one modular application includes a first application with signature-based intrusion detection functionality and a second application with behavioral based anomaly detection functionality.

8. The apparatus of claim 1, wherein the reconfigurable application layer includes modular applications that are deployed from an application marketplace, wherein each application is automatically installed or removed via a management tool.

9. The apparatus of claim 1, wherein the reconfigurable application layer includes applications not specific to any one vendor or manufacturer.

10. The apparatus of claim 1, wherein operation of hardware for the loop connection and the interceptor is controlled by a field programmable gate array.

11. The apparatus of claim 1, wherein the interceptor operates as a network test access point (TAP).

12. The apparatus of claim 1, wherein the interceptor operates as a switched port analyzer (SPAN).

13. The apparatus of claim 1, wherein the sending unit comprises redundant applications with respect to the receiving unit, and test results of the redundant applications are compared to check for anomalies.

14. The apparatus of claim 1, wherein the reconfigurable application layer is reconfigured by deploying, removing, or replacing applications individually according to security needs of the protected network.

* * * * *